United States Patent [19]

Yokoyama et al.

[11] Patent Number: 5,353,397
[45] Date of Patent: Oct. 4, 1994

[54] REGISTRATION/SEARCH SYSTEM FOR REGISTERING AND SEARCHING IMAGE DATA USING VECTOR DATA ATTRIBUTES

[75] Inventors: Yoshihiro Yokoyama, Yokohama; Yasuo Kurosu, Yokosuka; Seiichi Kanema, Yokohama; Hajime Uchiyama; Masahiro Okumura, both of Odawara; Naoaki Kubushiro, Minamiashigara; Masaaki Fujinawa, Hinodemachi; Hirowo Shimizu, Kumagaya, all of Japan

[73] Assignee: Hitachi, Ltd., Tokyo, Japan

[21] Appl. No.: 480,667

[22] Filed: Feb. 15, 1990

[30] Foreign Application Priority Data

Mar. 17, 1989 [JP] Japan .................. 1-63625

[51] Int. Cl.⁵ .......................................... G06F 15/62
[52] U.S. Cl. ................................ 395/145; 395/147
[58] Field of Search ........................... 395/145–148, 395/162

[56] References Cited

U.S. PATENT DOCUMENTS 5,086,497 2/1992 Horikawa et al. ............... 395/147
5,175,811 12/1992 Sone et al. ...................... 395/165 X

OTHER PUBLICATIONS

Foley, et al. *Computer Graphics: Principles and Practice,* Second Edition, pp. 30–33.
Enderle, et al. *Computer Graphics Programming,* pp. 15–16.

Primary Examiner—Heather R. Herndon
Assistant Examiner—Almis Jankus
Attorney, Agent, or Firm—Antonelli, Terry, Stout & Kraus

[57] ABSTRACT

A drawing data obtained by a CAD device is extended once to an image data on a plane and the extended image data is coded and stored in an electronic file device so that every display can be done by merely reading data stored in the electronic file device, decoding and displaying it. The image data having a plurality of attributes is stored attribute by attribute so that the electronic file device can display only image having attribute or attributes instructed and it is possible to obtain only required image information among various informations contained in a complicated image and thus searching is facilitated.

21 Claims, 10 Drawing Sheets

DRAWING DATA

| DRAWING INSTRUCTION | ATTRIBUTE | | | | THICK LINE DRAWING 31 | MEDIATE LINE DRAWING 32 | THIN LINE DRAWING 33 |
| --- | --- | --- | --- | --- | --- | --- | --- |
| | LINE KIND | LINE WIDTH | COLOR | COORDINATES | | | |
| LINEAR LINE | SOLID | THICK | BLACK | $(x_0\ y_0)(x_1\ y_1)$ | O | | |
| LINEAR LINE | SOLID | THICK | BLACK | $(x_2\ y_2)(x_3\ y_3)$ | O | | |
| LINEAR LINE | SOLID | THIN | BLACK | $(x_4\ y_4)(x_5\ y_5)$ | | | O |
| LINEAR LINE | SOLID | THICK | BLACK | $(x_6\ y_6)(x_7\ y_7)$ | O | | |
| CIRCLE | SOLID | MEDIATE | BLACK | $(x_8\ y_8)\ r_1$ | | O | |
| ELLIPSOIDAL | DOTTED | THIN | WHITE | $(x_9\ y_9)\ r_1\ r_2$ | | | O |

MH CODING TABLE

| NUMBER OF WHITE PIXELS | CODE WORD | NUMBER OF BLACK PIXELS | CODE WORD |
|---|---|---|---|
| 0 | 00110101 | 0 | 0000110111 |
| 1 | 000111 | 1 | 010 |
| 2 | 0111 | 2 | 11 |
| 3 | 1000 | 3 | 10 |
| 4 | 1011 | 4 | 011 |
| 5 | 1100 | 5 | 0011 |
| 6 | 1110 | 6 | 0010 |
| 7 | 1111 | 7 | 00011 |
| 8 | 10011 | 8 | 000101 |
| 9 | 10100 | 9 | 000100 |
| 10 | 00111 | 10 | 0000100 |
| 11 | 01000 | 11 | 0000101 |
| 12 | 001000 | 12 | 0000111 |
| 13 | 000011 | 13 | 00000100 |
| 14 | 110100 | 14 | 00000111 |
| 15 | 110101 | 15 | 000011000 |
| 16 | 101010 | 16 | 0000010111 |
| 17 | 101011 | 17 | 0000011000 |

REGISTRATION/SEARCH SYSTEM FOR REGISTERING AND SEARCHING IMAGE DATA USING VECTOR DATA ATTRIBUTES

BACKGROUND OF THE INVENTION

Present invention relates to a registration/search system for image data in an electronic file device connected to a computer aided design (CAD) device and, particularly, to such system capable of extending an image on a sheet produced by the CAD and having a plurality of attributes into a plurality of image planes attribute by attribute so that image data can be displayed at high speed in an easily searchable manner.

The CAD device has been used widely in preparation of drawings. In the CAD device, a drawing is prepared by inputting different kinds of graphic elements constituting the drawing and then inputting, thereto, positional relations therebetween by means of a pointing device such as tablet or mouse. Data concerning the drawing inputted is usually referred to as drawing data or vector data and includes data related to the kind of graphic elements and data of positions thereof in a certain coordinate system, which are stored in a memory.

In order to display such drawing data stored in the memory, the data is extended into a plane by such means as a drawing processor, that is, the drawing data is converted into image data which is stored in a display memory device. Such image data is referred to as raster data. The drawing processor converts coordinates which are a portion of the drawing data, calculates an address of the display memory device corresponding thereto, decodes the kind of data and draw the decoded data in the calculated address. Data concerning the kind of image elements includes attributes each being information defining one of a plurality of different display properties of the drawing including contour information such as straight line and/or circular line and information concerning the kind of line, i.e., solid line or dotted line, line width and color, etc.

In storing the drawing data in the memory, it is divided into logic units called segments. For example, when a drawing showing a layout of an office room is to be prepared, a group of drawing data which concerns items such as a desk and a chair which can be considered as a unit is assigned to a different segment and the coordinate-conversion of a plurality of such groups is performed segment by segment, so that the desk and the chair can be moved arbitrarily as a unit. Further, by deleting drawing data segment by segment or stopping drawing procedure, chairs, etc., can be erased easily.

For a display of a complicated drawing, only portions thereof bearing necessary information can be displayed by erasing the remaining portions of the complicated drawing.

An example of such device is disclosed in Japanese Patent Application Laid-Open No. 62-205423.

The electronic file device is one of office automation (OA) devices developed recently. The electronic file device serves to scan an original image, convert data obtained by scanning into image data and store it in an optical disk provided therein. It also serves to read and display the stored data on demand.

In the electronic file device, in order to increase the number of drawing sheets that can be stored in the optical disk, image data is coded to compress data amount. This compression procedure is referred to as coding process or compression process and data processed thereby is referred to as coded data. When coded data is derived from the optical disk for display, coded data is decoded to recover the image data. This decoding process is referred to as an extension process.

A typical coding/decoding system is a Modified Huffman (MH) system, a Modified READ (MR) system or a Modified MR (MMR) system, which is used in a facsimile device. In each of such systems, image data is handled as a mere series combination of white pixels and black pixels. In coding, the image data is inputted thereto starting at either end of the pixel series and converted into a coded data and, in decoding, the coded data is decoded to the image data from either end of the pixel series to output pixels.

An example of the electronic file device is disclosed in Japanese Patent Application Laid-Open No. 62-243067 and an example of the coding system is disclosed in Japanese Patent Application Laid-Open No. 59-126368.

Among the conventional techniques mentioned above, the CAD device can provide a very easily understandable display of a complicated drawing since it is possible to display only drawing data or segments thereof which belong to attributes required by an operator so that only necessary information of the complicated drawing is obtained. However, since it is necessary, in displaying, to deciphor various attributes of the drawing data and to perform a coordinate calculation, it takes a relatively long time until a display of one image is completed.

On the other hand, in the conventional electronic file device, the processing of data in displaying a drawing comprises a coded data decoding step and a decoded data conversion step which are simple in nature and the whole image is enough to be scanned once. Therefore, a high speed display is possible. However, since the content of image is not divided into segments each having inherent meaning and it is impossible to select only necessary image information, a whole image is displayed, causing search thereof to be difficult. Particularly, in a case of search while watching a plurality of images in succession, the search speed is much reduced since it takes long time to pick-up only necessary portions of each of the images displayed successively.

SUMMARY OF THE INVENTION

In view of the foregoings, a first object of the present invention is to provide an image data search system which can improve a display speed of an image in an electronic file device connected to a CAD device and improve a display of a complicated image so that only necessary portions thereof can be displayed, by converting a drawing data prepared by the CAD device into image data and storing it in the electronic file device.

A second object of the present invention is to provide an image data search system which can increase the amount of image data to be stored in an electronic file device by using information contained in a drawing data during a conversion of the drawing data into image data.

A third object of the present invention is to provide an image data search system which can increase a search speed in a searching system in which a plurality of images are watched in succession to pick-up necessary information therefrom, by displaying only necessary content of the images so that it can be distinguished from others easily.

A fourth object of the present invention is to provide an image data search system which can minimize a capacity of an image data extension memory to be used in converting drawing data into the image data.

A fifth object of the present invention is to provide an image data search system in which a drawing prepared by a CAD device and stored in the electronic file device is derived therefrom for correction in the CAD device and then re-stored in the file device.

In order to achieve the first object, according to the present invention, an electronic file device extends drawing data prepared by a CAD device and having a plurality of attributes to image data on a plane attribute by attribute, encodes and stores the image data attribute by attribute and decodes and displays the image data attribute by attribute. Alternatively, a plurality of images decoded according to their attributes may be synthesized and displayed. The attributes may include the kind of line, i.e., solid line or dotted line, line width, i.e., thick, medium or thin, and color, i.e., black or white. That is, data concerning attributes, for example, solid, thick and black line, are extended, encoded, stored in memory planes, decoded and displayed, attribute by attribute.

The second object of the present invention is achieved by coding and storing only necessary attributes of an image in the electronic file device. A plurality of coding means suitable for respective attributes are provided and image data each belonging to a certain attribute are coded by the coding means suitable therefor.

The third object of the present invention is achieved by reading, decoding and displaying image data belonging to a certain specific attribute successively. When an image which can not be distinguished from others on the basis of only successively displayed image data belonging to the specific attribute is displayed, all attributes of the image are read, decoded and displayed.

The fourth object of the present invention is achieved by coding image data obtained by plane-extending a drawing data, setting clipping regions in an area in which image data was coded and extending the drawing data in the clipping region.

The fifth object of the present invention is achieved by storing in the electronic file device not only image data but also drawing data before plane extension thereof.

A drawing data obtained by a CAD device is extended once to an image data on planes and the extended image data is coded and stored in an electronic file device. Although this processing requires deciphering of attribute, coordinate calculation and drawing process for the plane extension, a display speed is not affected thereby since every display can be done by merely reading data stored in the electronic file device, decoding and displaying it. Further, since the image data prepared by the CAD device is stored attribute by attribute, the electronic file device can display only image having attribute or attributes instructed, so that it is possible to obtain only required image information among various information contained in a complicated image and thus search is facilitated. Particularly, it is possible to display only an important portion of an image by making line kind, line width and color thereof different from those of other portions and assigning them in displaying.

In coding and storing drawing data in the electronic file device attribute by attribute, only image having attributes necessary for a final display is coded and stored therein. Therefore, it is possible to reduce the number of memory planes each to be used for a different attribute. When the number of memory planes is fixed, other images than the above mentioned image can be stored in the remaining planes and therefore it is possible to increase the number of image planes having different contents to be stored in the electronic file device having a limited storage capacity. Further, in coding drawing data according to attributes thereof, one of the coding means which has maximum compression rate for an image data having a specific attribute is used therefor, so that amount of image data for each of all attributes of the original image can be reduced. Therefore, a total amount of data indicative of the original image on one sheet can be reduced. In other words, it is possible to increase the number of image sheets having different contents and to store them in the electronic file device having limited storage capacity.

In searching something by watching successively displayed images, image data having attributes of an important portion of the image is read, decoded and displayed successively in the electronic file device. Since, in this case, the content of image is limited to the important portion and thus complexity is reduced, time necessary to identify an image sheet is reduced. Further, since the complexity of image content is reduced, decoding time is reduced and successive display speed is improved. For these reasons, searching time per image sheet is reduced. In other words, the number of images which can be searched within a certain constant time is increased and the search speed is improved.

In a case where, when the contents of images are limited to their main portions, there is a possibility of a plurality of images for which it is impossible to determine whether or not they are intended images, the successive display is stopped and images having all attributes are read, decoded, synthesized and displayed to obtain a complete image to thereby facilitate identification thereof.

In plane-extending the drawing data to the image data and coding it, the coding is performed after a plane-extension of one attribute is completed. A plane-extension of a next drawing data is performed by setting a clipping region in an area for which coding operation is completed. With this scheme, the memory capacity necessary for plane-extension of the next drawing data can be smaller than that when it is done in another memory region and the process speed becomes higher than that when the plane-extension is commenced after a coding of a preceding drawing data having different attribute.

In order to make a correction of a drawing, which is prepared by the CAD device, plane-extended, coded and stored in the electronic file device attribute by attribute, possible, the stored drawing data is returned to the CAD device for correction and the corrected drawing data are restored in the electronic file device together with the image data before plane-extension. Thus, the stored image can be corrected easily by means of the CAD device.

DETAILED DESCRIPTION OF THE PREFERRED EMBODIMENTS

An embodiment of the present invention will be described with reference to FIG. 1 which shows the whole construction of this embodiment in block diagram.

A vector image information input device 11 may comprise a CAD device to which an operator inputs an image. The image inputted is sent, in the form of drawing data, to a vector/raster converter 12.

The vector/luster converter 12 selects necessary data from the drawing data according to registration attribute information supplied from a registration/search attribute indicator 112, plane-extends only the drawing data having the attribute instructed and converts the extended data into an image data.

The image data is stored in one of memory planes of a coding image memory 13. When a plurality of attributes are instructed, corresponding drawing data are extended in different planes respectively and resultant image data are stored in different memory planes of the coding image memory 13, respectively.

The coding image memory 13 stores the image data converted from the drawing data by the vector/raster converter 12 and outputs the stored image data to a selector 14. As mentioned, the coding image memory 13 comprises a plurality of memory planes in each of which image data supplied from the vector/raster converter 12 and having a different atribute is stored and from each of which the stored data is supplied to the selector 14.

The selector 14 receives image data stored in one or more memory planes, selects necessary image data from them according to registered attribute information supplied from the attribute indicator 112 and sends the selected image data to a coding device 15.

The coding device 15 converts the selected image data into coding data to compress the selected image data and supplies the coded data to an optical disk device 16. As to the coding system, the MH system, MR system or MMR system, which is usually used in facsimile device may be used as mentioned previously.

The optical disk device 16 stores the coding data supplied from the coding device 15. At the same time, the optical disk device 16 also stores the attribute or attributes of the drawing data from which the coding data is obtained. This is done by using the registration attribute information inputted from the registration/search attribute indicator 112. The optical disk memory device 16 utilizes the search attribute information supplied from the registration/search attribute indicator 112 to supply coding data whose attribute is consistent with the search attribute to a decoding device 17.

The decoding device 17 converts the coded data from the optical disk memory device 16 into the original image data which are stored in different memory planes of a decoded image memory device 18 attribute by attribute and sent to a selector/synthesizer device 19, separately.

The selector/synthesizer device 19 selects necessary data from the image data supplied thereto by the decoded image memory device 18 according to the search attribute information from the registration/search attribute indicator device 112 and sends the selected image data to a display memory device 110.

When the selector/synthesizer device 19 receives a plurality of search attributes, it selects a plurality of image data having the assigned attributes from the image data supplied from the decoded image memory device 18, combines them and supplies a resultant image data to the display memory device 110.

The display memory 110 stores the image data supplied from the selector/synthesizer device 19 and simultaneously sends it to a display device 111. The display device 111 displays the image data supplied by the display memory device 110.

The registration/search attribute indicator 112 sends the attribute information inputted by the operator to the vector/raster converter 12, the selector device 14 and the optical disk memory device 16 as the registration attribute information at a time of image data recordation and to the optical disk memory device 16 and the selector/synthesizer 19 as the search attribute information at a time of image data display.

A processing concerning line width to be performed by the device shown in FIG. 1 will be described with reference to FIGS. 2 and 3.

Figure 2:
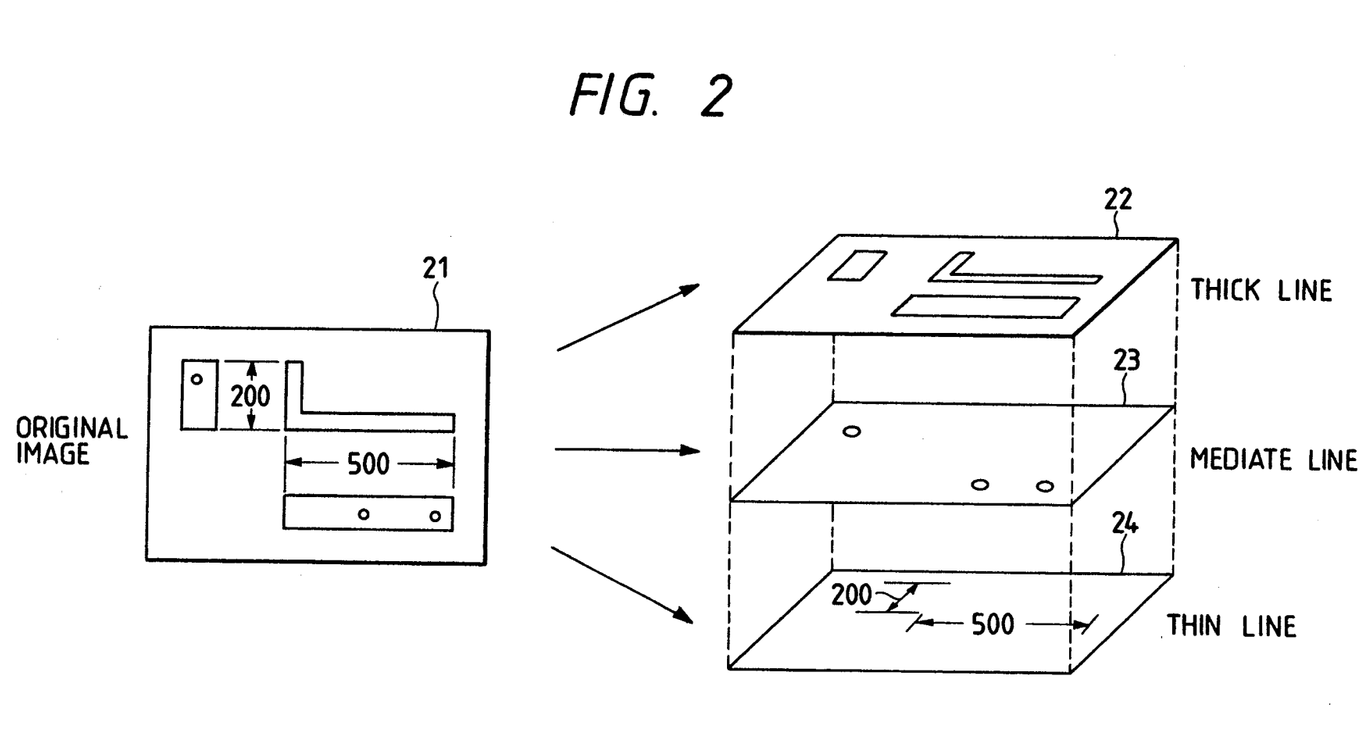
FIG. 2 illustrates an example of decomposition of drawing data according to line width attributes.
Figure 3:
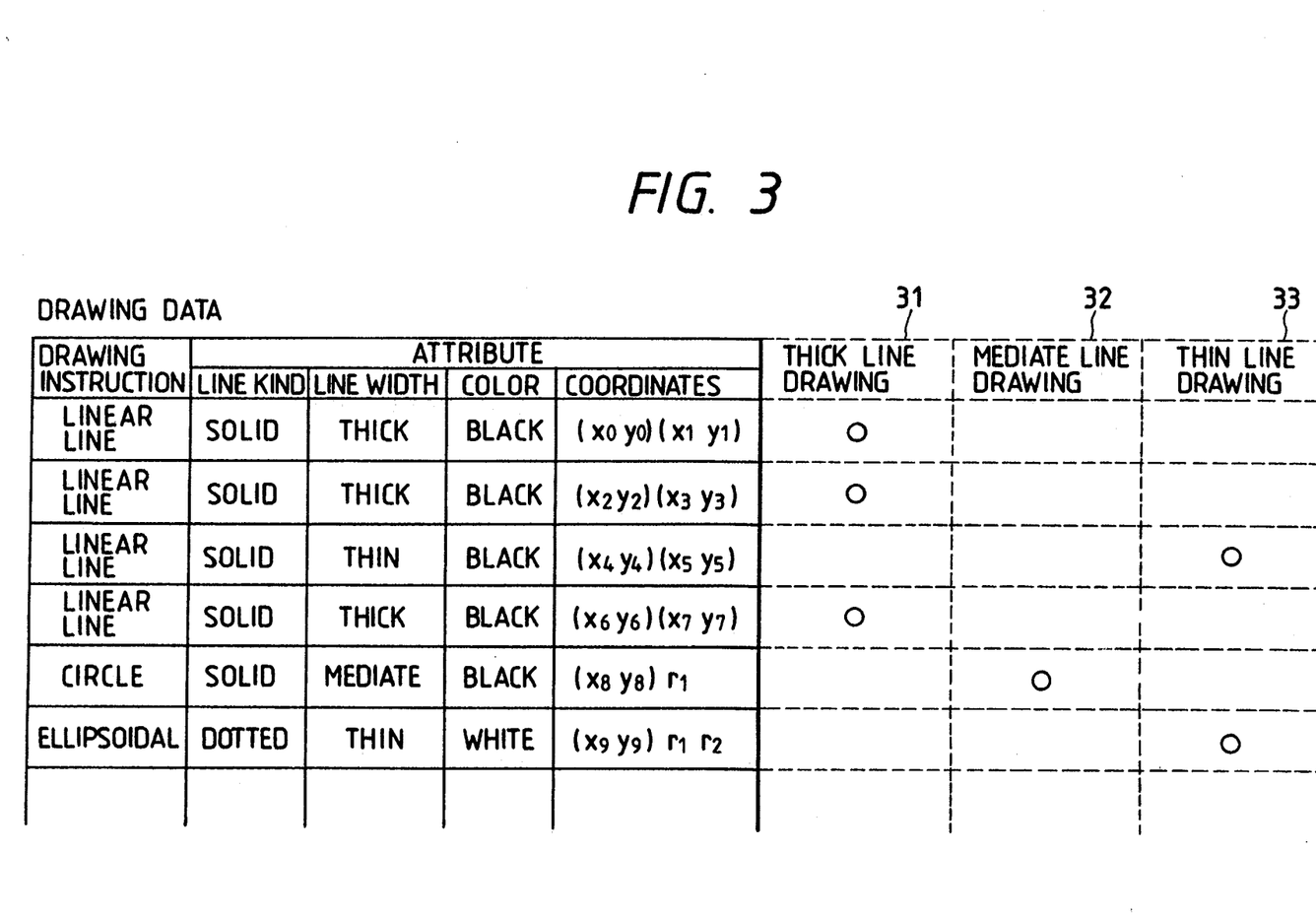
FIG. 3 shows an example of drawing data prepared by a CAD device.

FIG. 2 shows an example of decomposition of an original image according to line width and FIG. 3 shows an example of drawing data prepared by the CAD device.

For a registration processing, the operator forms an original image 21 through the vector image information input device 11, from which the image data is formed.

The drawing data indicative of the original image 21 is shown in FIG. 3. Basic drawing data includes a drawing instruction representing constitutional components of the image, such as linear line, circular line or ellipsoidal line, and attributes such as kind of line, e.g., solid line or dotted line, line width, color and coordinates system representing drawing line position.

When the vector image information input device 11 sends the drawing data shown in FIG. 3 to the vector/raster conversion device 12, the latter extends in planes the drawing data which corresponds to the registration attribute information supplied from the registration/search attribute indicator 112 to image data. For line width, thick lines, middle lines and thin lines are extended in respective planes. That is, when the vector/raster converter 12 processes the drawing data in FIG. 3 from a top downwardly sequentially for plane-extension thereof, the drawing instruction for plane-extension is limited to one having an instructed attribute value correspondingly to line width. For thick lines indicated by circles in a thick line drawing column 31, the drawing instructions corresponding thereto are extended in a plane and stored in a memory plane of the coding image memory 13. For mediate lines indicated by circles in a mediate line drawing column 32, the drawing instructions corresponding thereto are extended in a plane and stored in a plane of the coding image memory 13 which is different from the plane of the memory 13 for the thick lines. The same is performed for thin lines indicated by circles in a thin line drawing column 33. When a plurality of attributes such as mediate lines and thin lines are assigned simultaneously by the registration/search attribute indicator 112, the drawing instructions corresponding to circles in either the mediate drawing column 32 or the thin line drawing column 33 may be extended in one plane since there is no need of distinguishing between them.

With the different plane-extensions for the respective attributes, the coding image memory 13 stores in its different memory planes the thick line image 22, the mediate line image 23 and the thin line image 24, respectively.

According to the registration attribute information of either the thick line, the mediate line or the thin line supplied from the registration/search attribute indicator 112, the selection device 14 selects the thick line image 22, the mediate line image 23 or the thin line image 24 in the memory 13 and sends the selected image to the coding device 15. Since the latter performs a coding operation of an image data on one sheet at one time, the registration/search attribute indicator 112 assigns thick line, mediate line and thin line in sequence and the selector 14 sends the thick line image 22 in one memory plane, the mediate line image 23 in another memory plane and the thin line image 24 in a further memory plane to the coding device 15 sequentially.

The coding device 15 codes the sequential image data from the selector 14 for data compression and the compressed data is sent to the optical disk memory 16.

Figure 1:
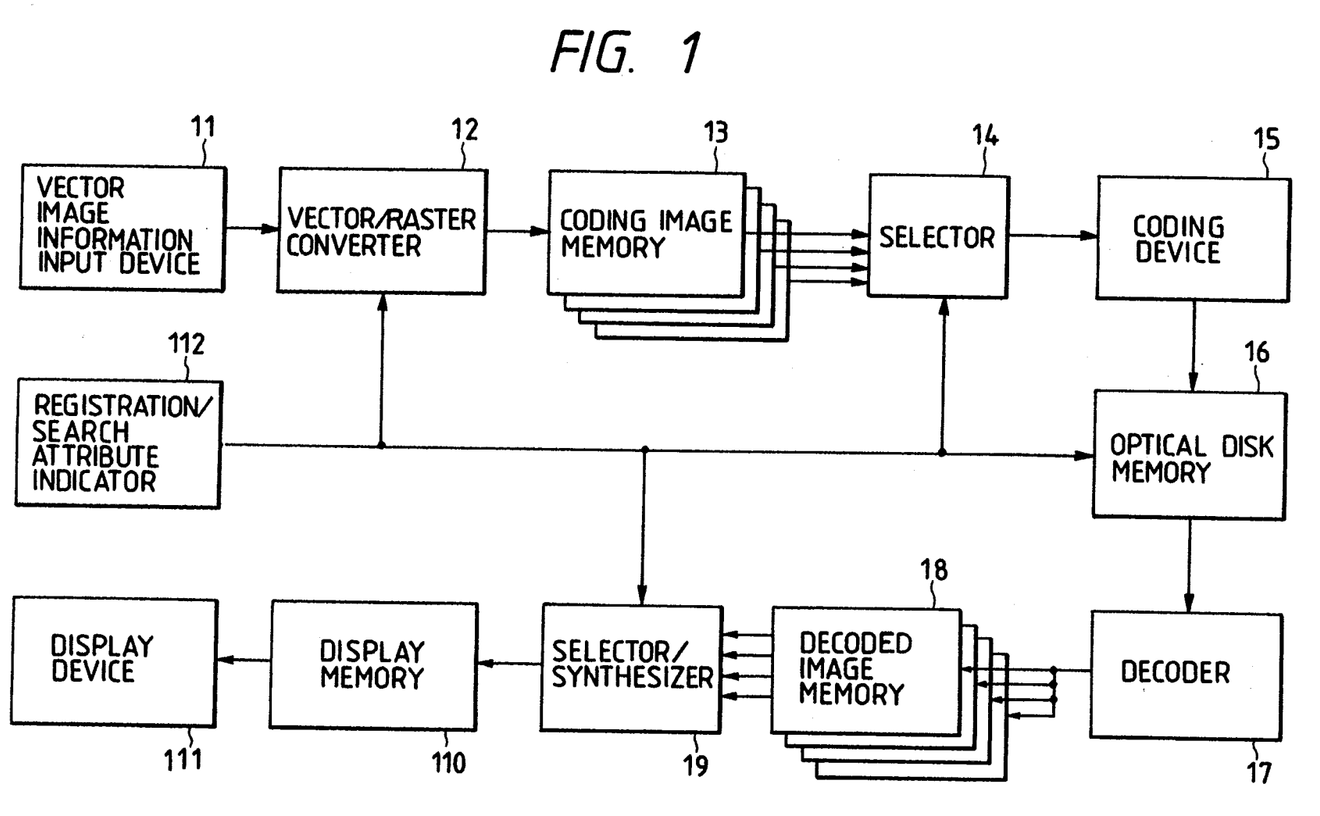
FIG. 1 is a block circuit diagram showing an embodiment of the present invention.

As shown in FIG. 1, the optical disk memory 16 stores the registration attribute information supplied sequentially from the registration/search attribute indicator 112 and the coded data supplied sequentially from the coding device 15 correspondingly to the attributes in the registration attribute information.

When a registered image is to be searched and displayed, the operator inputs, to the registration/search attribute indicator 112, the line width information of thick line, mediate line and thin line. The indicator 12 assigns the thick, mediate and thin line widths to the optical disk memory 16 as registration attribute information upon which the optical disk memory 16 supplies, to the decoder 17, the coded data concerning to the attributes of thick, mediate and thin lines, sequentially.

The decoder 17 decides the coded data to obtain the thick line image 22, the mediate line image 23 and the thin line image 24, sequentially, to thereby recover the image data which are stored in respective memory planes of the decoding image memory 18.

The selector/synthesizer 19 responds to one of the search attribute information from the registration/search attribute indicator 112 to select the image data in one of the memory planes of the decoding image memory 18 which belongs to the one search attribute information and sends it to the display memory 110. Assuming that thick line is assigned as attribute, for example, the thick line image 22 is selected by the selector/synthesizer 19 and sent to the display memory 110. On the other hand, in a case where the thick, mediate and thin lines are assigned at one time, the thick line image 22, the mediate line image 23 and the thin line image 24 are combined by the selector/synthesizer 19 and the resultant image data corresponding to the original image 21 is sent to and stored in the display memory 110.

The display device 111 gives a display of the image data stored in the display memory 110 to the operator at a suitable display time.

As to the processing of the attribute concerning to kind of line, i.e., solid line or dotted line, and color, i.e., black or white, in FIG. 3, drawing data thereof is plane-extended every kind of line and every color in the same manner as that for the line width.

As described, according to this embodiment in which attributes of image data can be arbitrarily set, stored in the optical disk memory according to the attributes, readout from the memory and displayed, it is possible to display the image repeatingly at a higher speed than the case of the CAD device and to selectively display any necessary one of attributes of a complicated image.

Now, a second embodiment, in which only images belonging to attributes which are indespensable as image information for a final display are coded and stored, will be described.

If an operator decides that final values for the original image 21 are unnecessary because they may be changed in various ways, he inputs thick line and mediate line to the registration/search attribute indicator 112 in performing a registration. The indicator 112 assigns to the vector/raster converter 12 thick line and mediate line as registration attribute information. The vector/raster converter 12 stores only the thick line image 22 and the mediate line image 23 in the coding image memory 13. Then, the thick line image 22 and he mediate line image 23 are converted into coded data by the coding device 15 and stored in the optical disk memory 16.

According to the second embodiment, it is enough to store, in the optical disk memory 16, coded data of only the thick line image 22 and the mediate line image 23 while coded data of the thin line image 24 is eliminated. Therefore, it is possible to reduce memory capacity necessary for an image on one sheet. In other words, it is possible to increase the number of image sheets which can be stored in the optical disk memory 16.

Figure 4A:
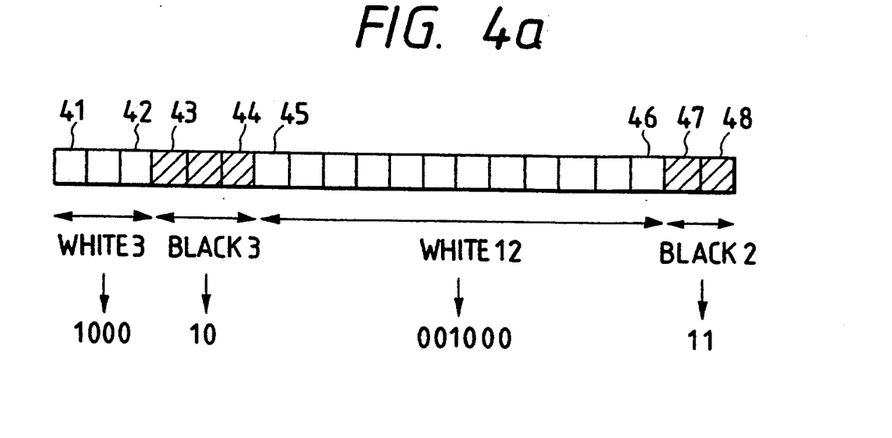
FIGS. 4a and 4b illustrate an MH coding system.
Figure 4B:
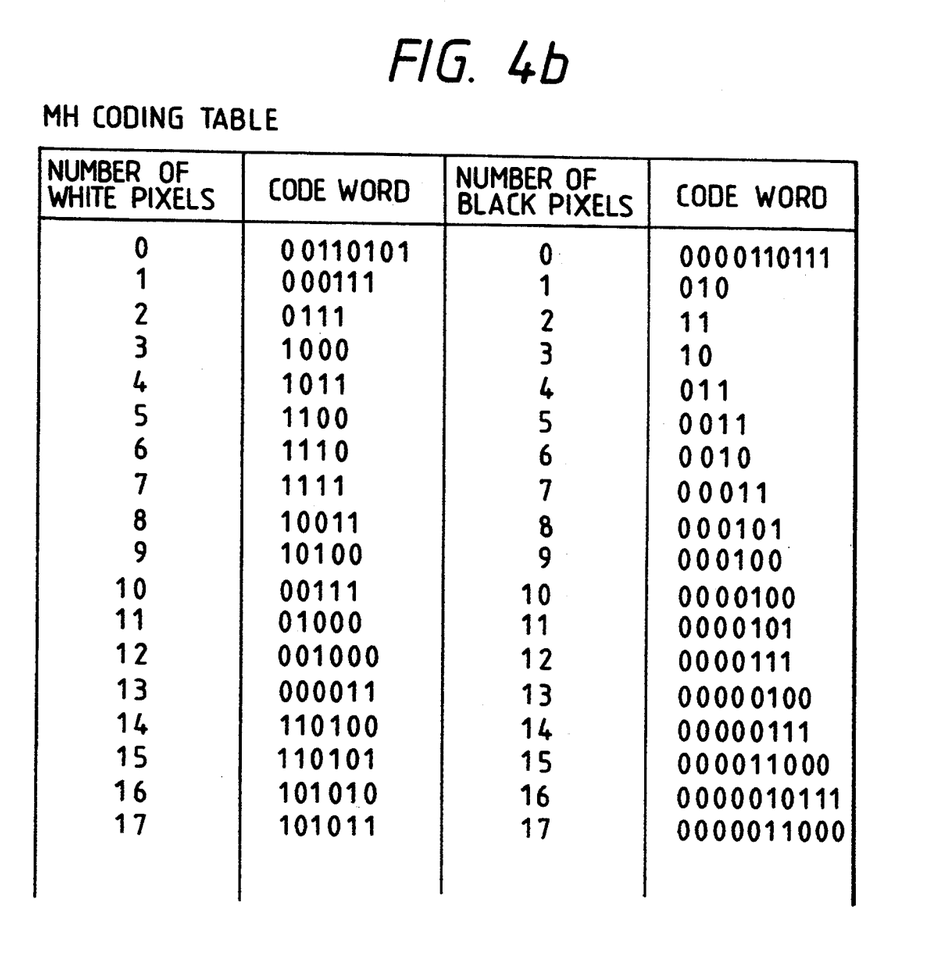

FIGS. 4a and 4b show a MH coding system used in a facsimile device. Another embodiment of the present invention, in which a plurality of coding means are provided and any of them, which is optimum for image data having any of various attributes, is used therefor, will be described with reference therewith.

In the MH coding system, the number of successive white pixels and the number of black pixels are assigned to coding data as shown in an MH coding table in FIG. 4b. As shown in FIG. 4a, there are three white pixels 41 to 42 arranged successively which is represented by a code word 1000 as shown in the MH coding table in FIG. 4b. Therefore, the series of three white pixels 41-42 is converted into a coded data 1000. Similarly, there are a series of three successive black pixels 43 to 44 which is converted into 10 according to the MH table in FIG. 4b. A series of twelve white pixels 45 to 46 is converted into 001000 and a series of two black pixels 47 to 48 is converted into 11 in the similar manner. Thus, the image data shown in FIG. 4a is converted into a code data 10001000100011.

As well known, the MH code table shown in FIG. 4b is prepared by collecting statistics of frequency of occurences of white pixel number and black pixel number with respect to a standard original and assigning shorter code data to pixel number whose frequency of occurence is higher. Therefore, there may be a case where a data compression rate is improved by changing assignment of code word for an image other than the standard original. On the other hand, since widths of line of an image prepared by a CAd device are predetermined and therefore frequencies of occurence of black pixel having such line widths are high, the compression rate is increased by assigning them shortest code data thereto. That is, for an image having only thick lines whose width is 5, a series of five black pixels is assigned with a code data of not 0011 but 10 and a series of three black pixels is assigned with a code data of 0011. Similarly, for an image having only thin lines whose width is 1, a code data of one black pixel is not 010 but 10. For an image having only mediate line whose width is 3, the MH code data table may be used.

According to the present invention, image data is supplied from the selector 14 to the coding device 15 according to respective line widths. The coding device 15 includes the above mentioned three coding tables and, in coding the image data according to the line width, uses the coding table in which code data 10 is assigned to a series of 5 black pixels for thick line image data, the MH coding table for mediate line image data and the coding table in which code data 10 is assigned to one black pixel for the thin line image data.

According to this embodiment, it is possible to use any of the coding means which provides the highest compression rate for the image data belonging to an aimed line thickness. Therefore, it is possible to reduce the amount of code data compared with that using only the MH table. In other words, it is possible to increase the number of images which can be stored in the optical disk memory 16.

Figure 5A:
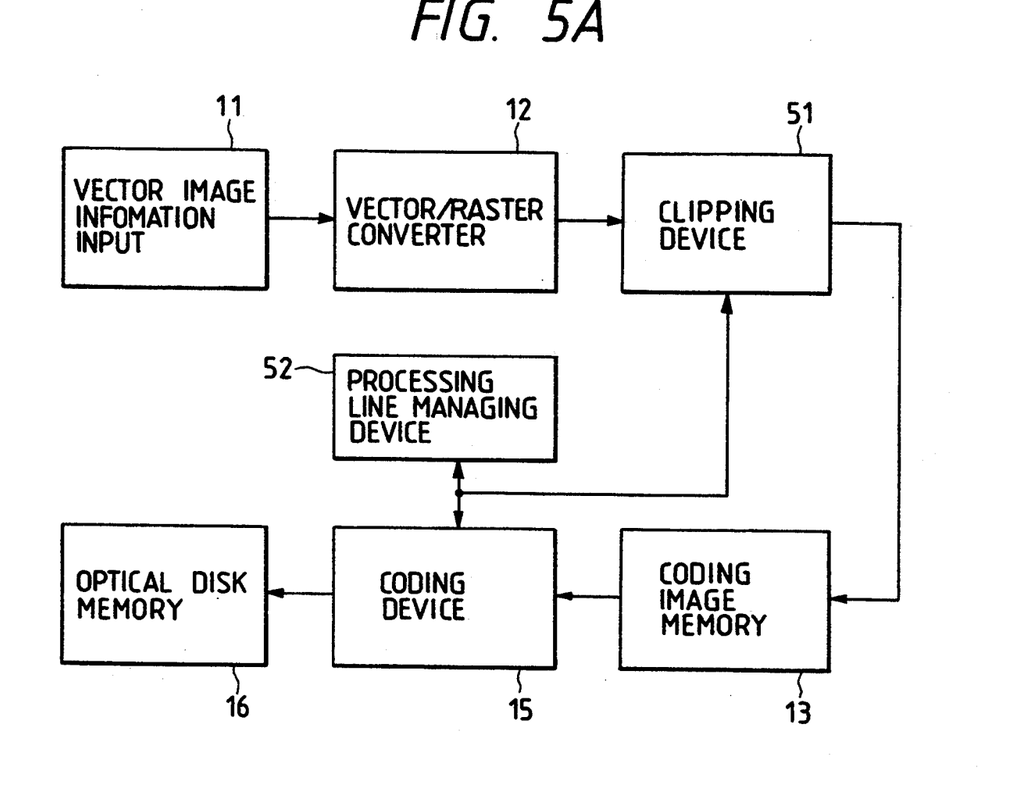
FIG. 5a is a block diagram of another embodiment of the present invention.

FIG. 5a shows another embodiment of the present invention by which it is possible to reduce a capacity of coding image memory 13.

As shown in FIG. 5a, this embodiment is different from the embodiment shown in FIG. 1 in that a clipping device 51 and a process line managing device 52 are added while the selector 14 is removed and the coding image memory 13 has only one memory plane.

In FIG. 5a, when the vector/raster converter 12 plane-extends the drawing data into the image data and stores it in the coding image memory 13, the clipping device 51 serves to limit a region of plane-extension to a portion of the coding image memory 13, i.e., to a clipping region. The process line managing device 52 controls the processing such that the clipping region set by the clipping device 51 does not overlap with a position of processing of the image in the coding device 15.

Figure 5B:
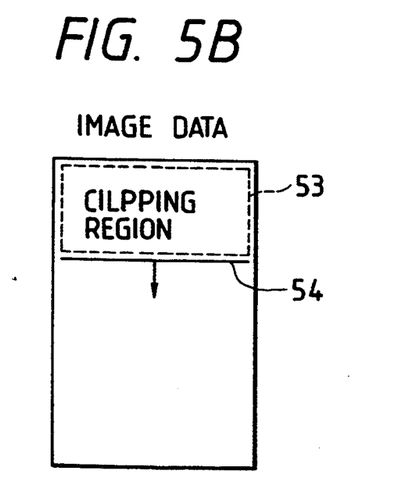
FIGS. 5b and 5c are illustrations of image data for explanation of a clipping region.
Figure 5C:
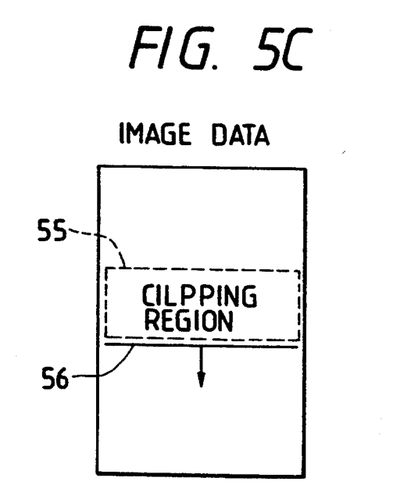

FIGS. 5b and 5c show positional relations of processing to be performed in the image data by the clipping device 51 and the process line managing device 52, respectively. In FIG. 5b, when the coding device 15 has started a coding at the uppermost line of the image data and, now, is coding a process line 54, the process line managing device 52 manages the process lines above the line 54 as coded with respect to the coding device 15 and instructs the clipping device 51 to set the clipping region 53. The clipping device 51 limits the plane-extension in the vector/raster converter 12 in the clipping region 53 which is now unnecessary for coding. Further, in FIG. 5c, the coding of the coding device 15 proceeds from the line 54 to a line 56 and thus image data in between the process lines 54 and 56 becomes unnecessary because it was coded. In this case, the process line managing device 52 instructs the clipping device 51 to set a clipping region 55 and the clipping device 51 controls the plane-extension performed by the vector/raster converter 12 within the clipping region 55.

When the coding device 15 completes the coding of the lowermost line of the image data, the coding is restarted at the uppermost line because the upper portion of the image data is updated to data to be coded next.

According to this embodiment, it is possible to realize both the plane-extension and the coding by means of the single coding image memory 13 and thus the memory capacity necessary becomes reduced compared with the coding image memory having a plurality of memory planes for respective attributes.

Now, an embodiment of management of data in the optical disk memory 16 will be described.

Figure 6:
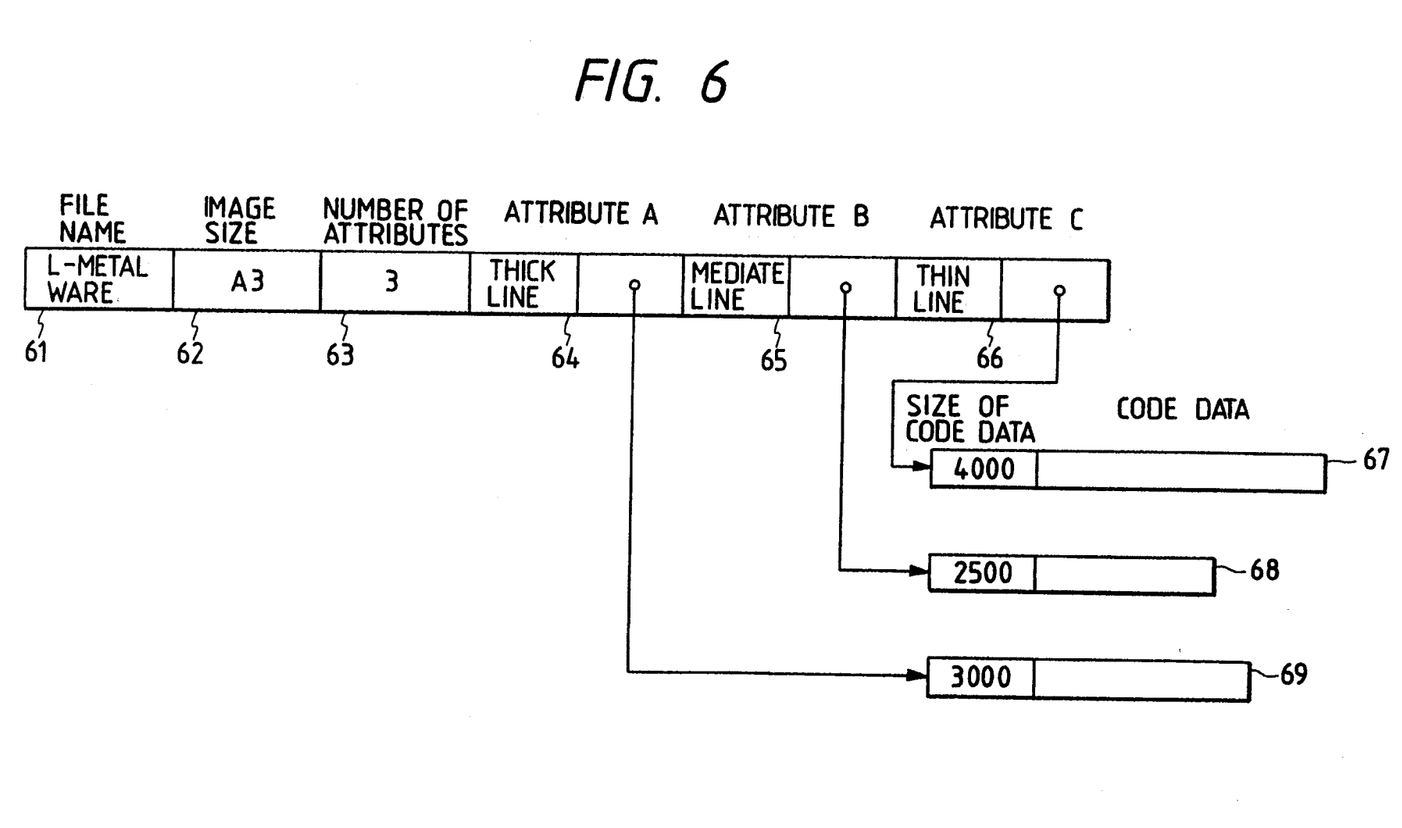
FIG. 6 shows an example of data construction on an optical disk memory.

FIG. 6 shows an example of data construction of an image, which includes file name 61, image size 62, number of attributes (63), an attribute A 64, an attribute B 65 and an attribute C 66. The file name 61 stores a name of the original image 21 having all of the attributes 64, 65 and 66, in the shown example, L-shaped metal ware. The image size 62 stores an information of the size of the original image 21, in this case, A3. The attribute number 63 stores the number of registration attribute information assigned by the registration/search attribute indicator 112, in this case, three, i.e., thick line, mediate line and thin line. The attributes A, B and C store attribute names of them, i.e., thick, mediate and thin lines and pointers to respective code data 69, 68 and 67, respectively. The coding data 67, 68, 69 are data to be supplied from the coding device 15 to the optical disk memory 16.

The data construction shown in FIG. 6 is stored in the optical disk memory for every image.

Figure 7:
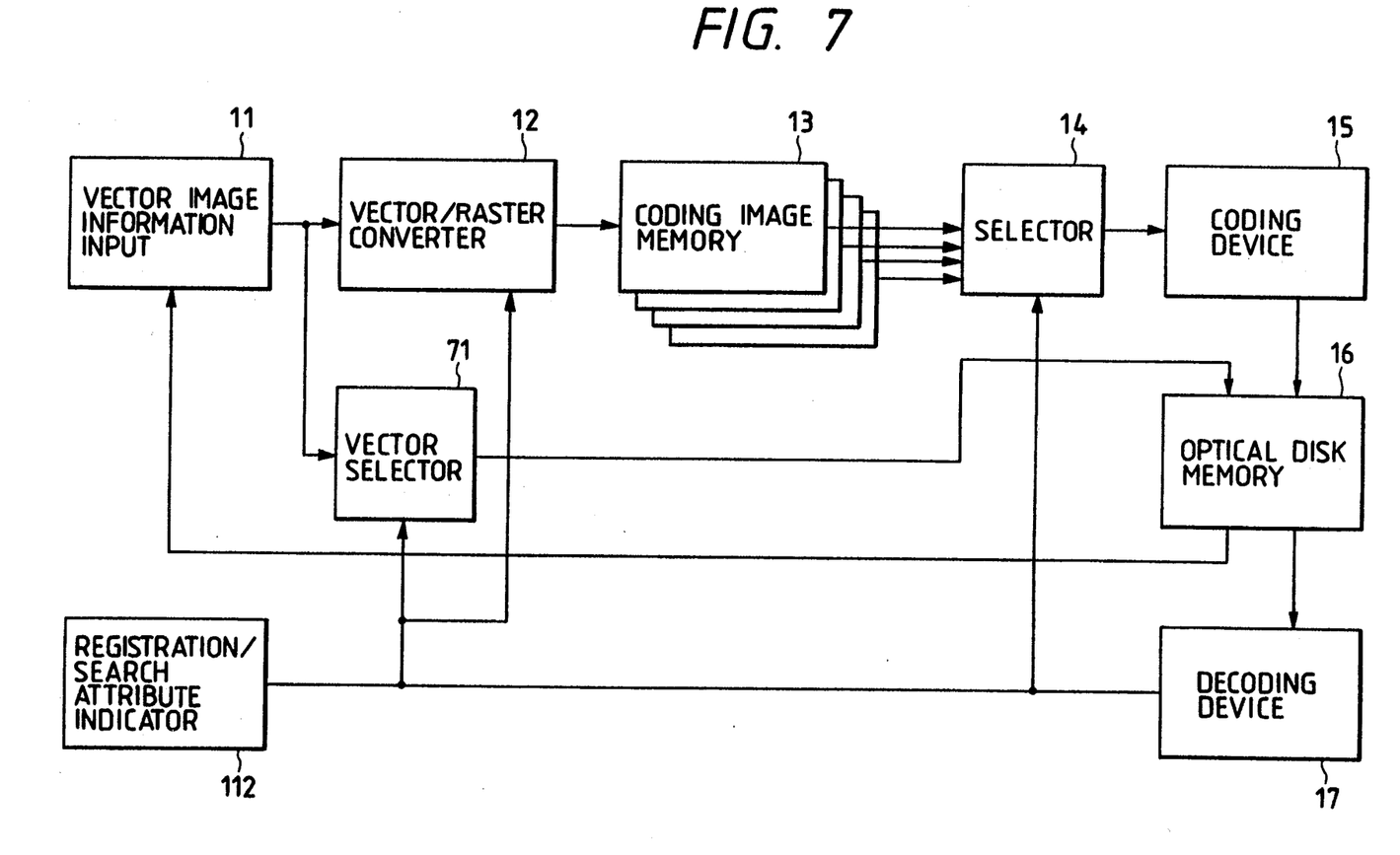
FIG. 7 is a block diagram of another embodiment of the present invention.

FIG. 7 shows a construction of another embodiment of the present invention. The embodiment in FIG. 7 is different from the embodiment shown in FIG. 1 in that a vector selection device 71 is added so that data from the vector selection device 71 can be stored in the optical disk memory 16 and the data stored in the optical disk memory 16 can be outputted to the vector image input device 11. The vector selection device 71 responds to the registration attribute information from the registration/search attribute pointing device 112 to select drawing data from the vector image input device 11 and to store in the optical disk memory only drawing data having attribute assigned.

In a registration process, the drawing data produced by the vector image information input device 11 are transformed into code data of every attributes by the vector/raster transforming device 12, the coded image memory device 13, the selector 14 and the coding device 15. On the other hand, the vector selector 71 stores the drawing data prior to code data conversion, together with the code data.

In searching process, a high speed display is performed by using the code data. However, in image correction process, drawing data is returned from the optical disk memory 16 to the vector image information input device 11, corrected therein and registered again.

Figure 8:
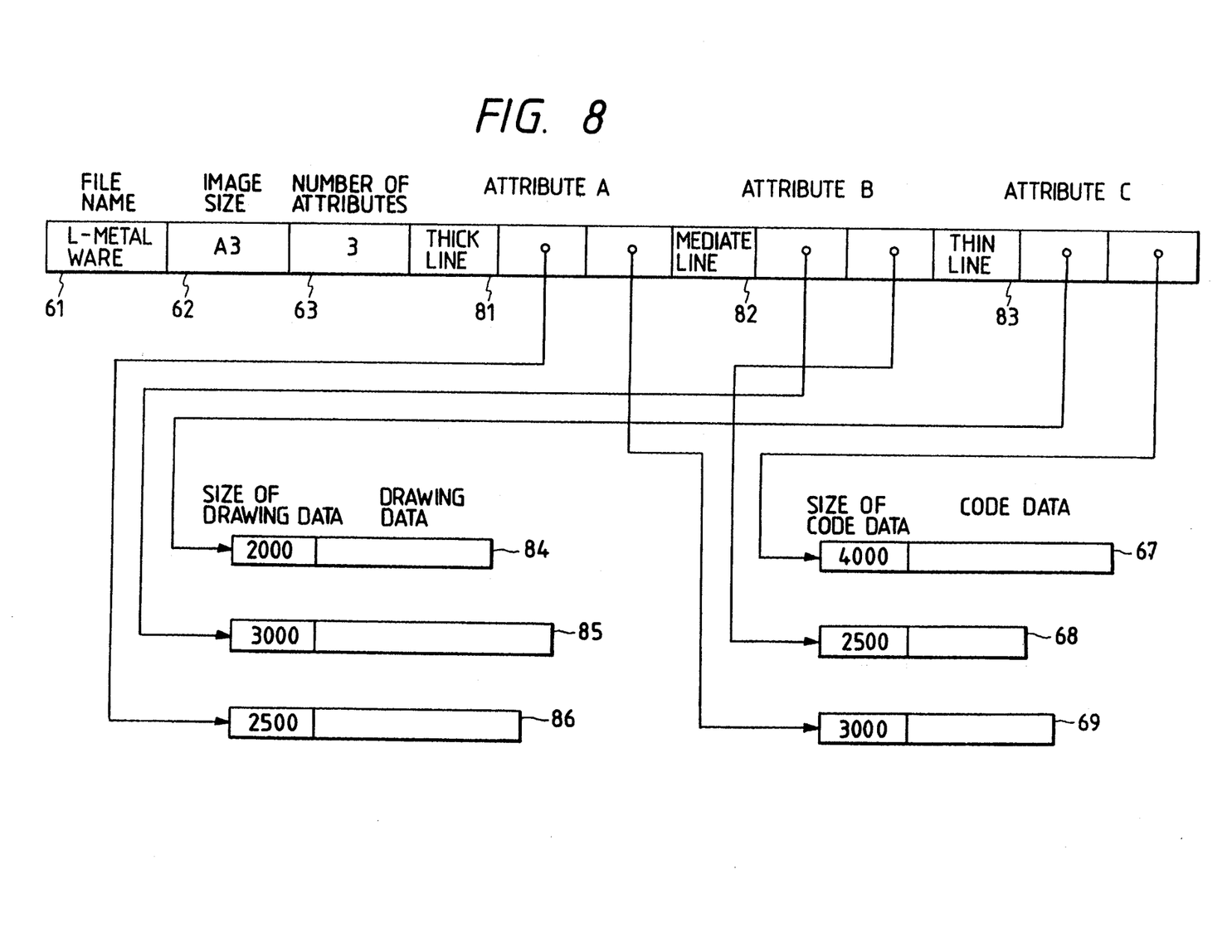
FIG. 8 shows an example of data construction on an optical disk memory for storing an image data as well as coding data.

FIG. 8 shows a construction of data in an optical disk memory 16, which is similar to that shown in FIG. 6 except that attributes A81, B82 and C83 further include drawing data 86, 85 and 84, respectively, so that drawing data supplied from a vector selection device 71 can be stored and drawing data supplied to the image information input device 11 can be outputted.

As mentioned, according to the present invention, it is possible to correct an image easily even after it is stored.

Another embodiment of the present invention by which it is possible to search while watching images will be described with reference to FIGS. 1, 9 and 10.

Figure 9:
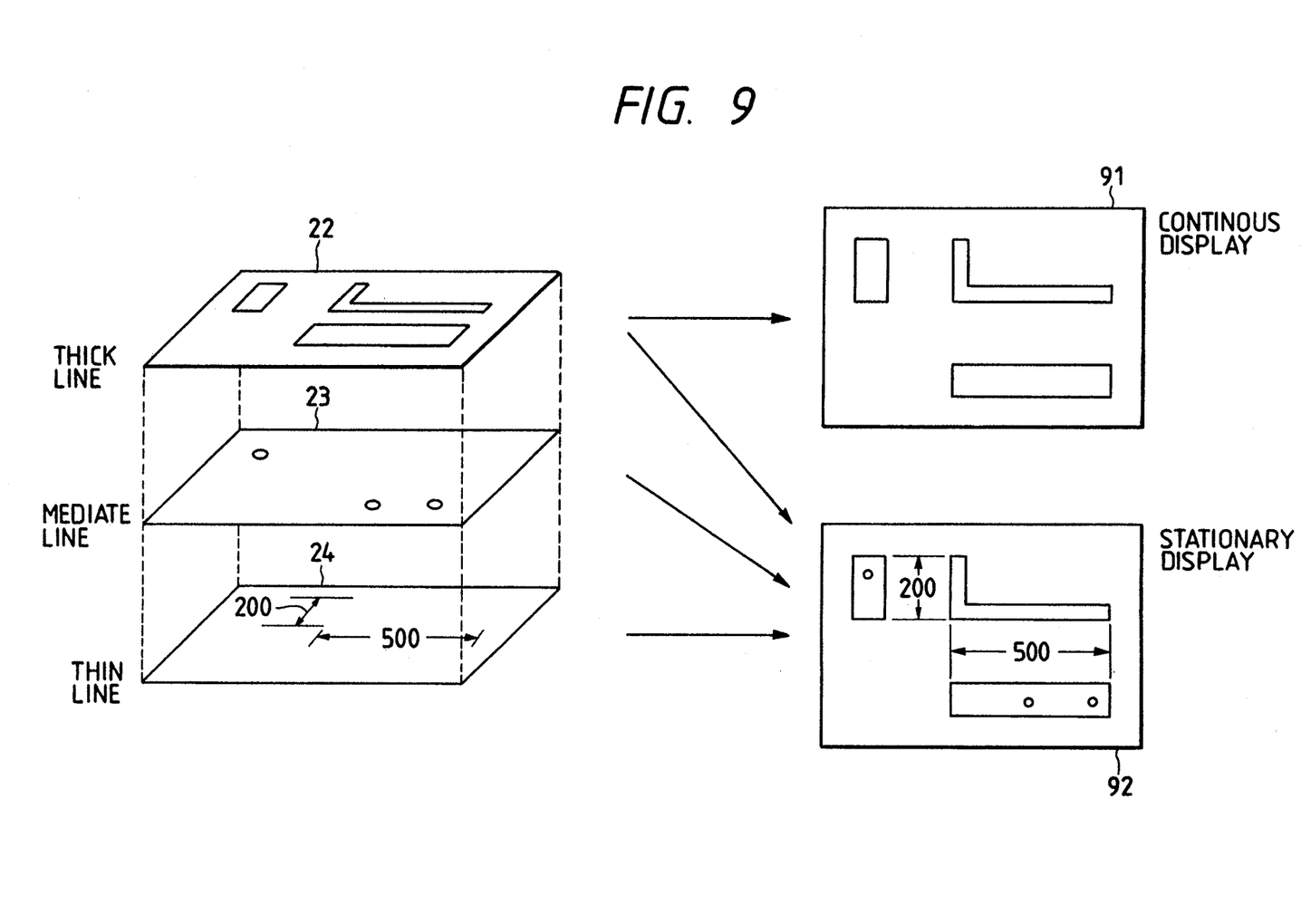
FIG. 9 shows an example of display content during search.
Figure 10:
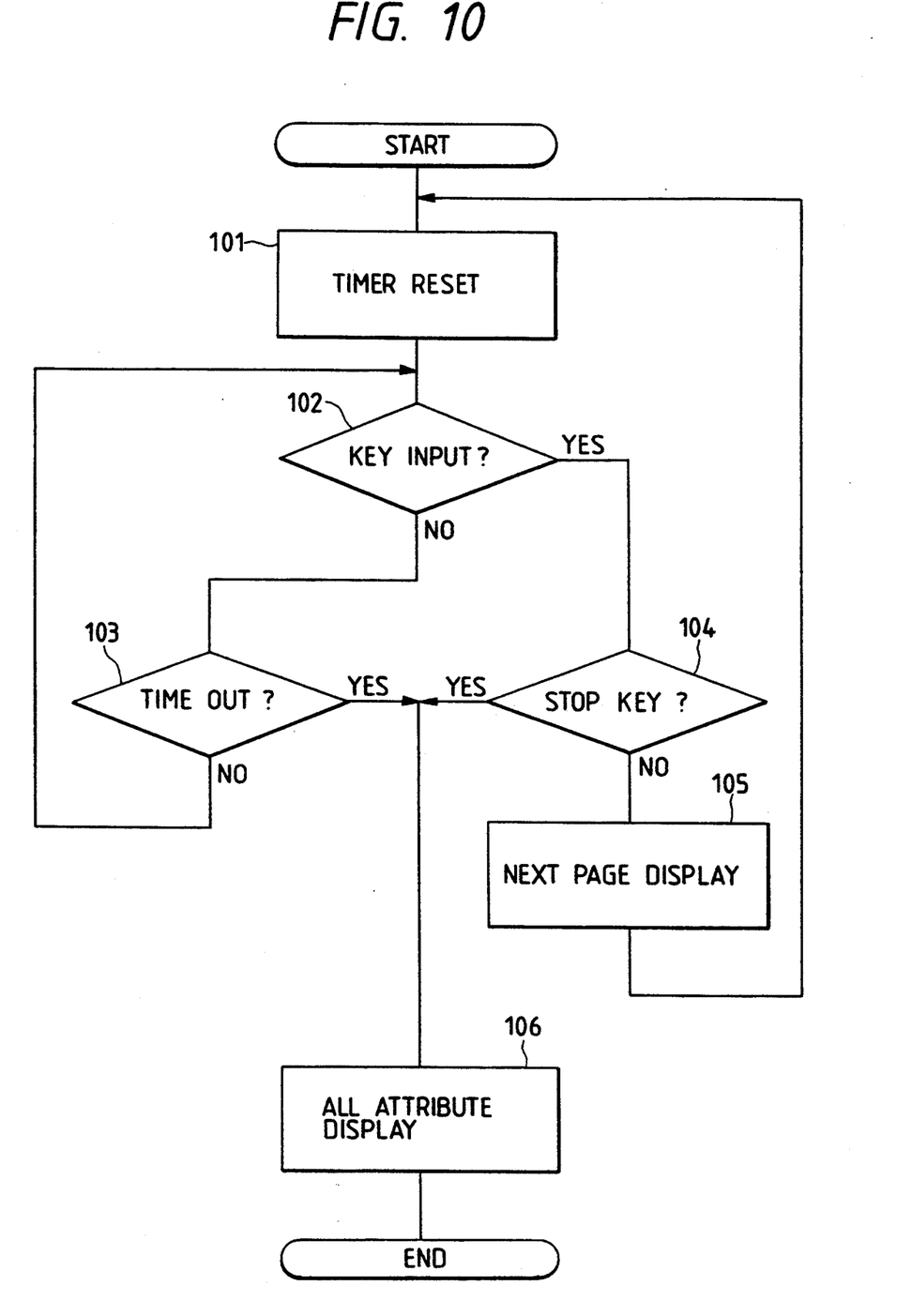
FIG. 10 is a flowchart of an operation program of an indicator for indicating registered attributes to be searched.

FIG. 9 shows a display content of a display device 111 during searching and FIG. 10 is a program of a registration/search attribute instruction device 112.

The optical disk memory 16 has stored thick line image 22, mediate line image 23 and thin line image 24 by registration processing and a processing is started under assumption that a main portion of the image is constructed by thick line. In a timer reset stage 101, a timer is initially reset so that the search, which is to be performed while watching successive images, is terminated unless the operator demands a display of a next image. In a key input stage 102, it is determined whether or not the operator key-inputted to the registration search attribute assigning device 112. When there is no key-input, it is determined in a timeout stage 103 whether or not the timer which was initially set in the timer reset stage 101 has counted for a constant time period. When the timer does not count for the time duration, the operation is returned to the key input stage 102 and the same operation is repeated. The fact that the timer completes the counting for that constant time, means that the operator continues to watch an image for that time, in other words, the image displayed is just the image the operator wants to see or the operator can not decides whether or not the image displayed by thick line is the image he wants to see. Therefore, the operation is moved to an all attribute display stage 106. In the stage 106, images of all attributes are combined and displayed.

On the other hand, when, in the step 102, it is decided that there is the key input, the operation is moved to a stop key judge stage 104. When the key input by the operator is not the stop key which means that the operator wishes to do a search for a next image display, the operation is moved to a next page display stage 105.

In the stage 105, the registration/search attribute indicator 112 outputs thick line as the search attribute information and coded data of thick line of the next page which is stored in the optical disk memory 16 is converted into image data by the decoding device 17 and displayed on the display device 111 as such as a continuous display 91 in FIG. 9 through the decoding image memory 18, the selection/synthesizer device 19 and the display memory device 110.

When, in the step 104, it is decided that the input is the stop key, the operation is moved to the all attribute display stage 106. In the step 106, the registration/search attribute indicator 112 outputs all attributes as the search attribute information, upon which the optical disk memory 16 outputs coded data of mediate line and thin line to the decoder 17 which converts them into image data which are stored in the decoding image memory 18. Since the latter is storing thick line image data for continuous display, the selection/synthesizer 19 combines images of all attributes and the combined images are displayed on the display 111 as a stop display 92 in FIG. 9 through the display memory 110.

As described hereinbefore, according to this embodiment by which thick line representing main portions of an image is displayed at the continous display, the watching is easy and discrimination time is shortened, resulting in an improvement of searching time.

According to the present invention by which, in transforming drawing data produced by such as CAD device into image data for use in an electronic file device, the drawing data can be divided, transformed, registered, searched and displayed attribute by attribute, it is possible to repeatingly displayed at higher speed than in the case of only the CAD device is used and to provide a clear display of even complicated image.

Further, since image data can be converted into code data and stored by using an optimum coding system for each attribute or image data of only necessary attribute is converted into code data and stored, it is possible to increase the number of images which can be stored in a limited memory capacity of an optical disk memory.

What is claimed is:

1. An image data registration and search system for an electronic file device, comprising:
    input means for inputting vector data of a drawing having a plurality of output primitive attributes each defining one of a plurality of different display properties of said drawing;
    conversion means for converting said vector data into image data by respective output primitive attributes;
    coding means for coding said image data to code data by respective output primitive attributes;
    storage means for registering said code data with respective output primitive attributes;
    code data deriving means for searching said storage means with respective output primitive attributes and deriving said code data corresponding to respective output primitive attributes from said storage means;
    decoding means for decoding said code data derived from said storage means to restore said image data corresponding thereto by respective output primitive attributes; and
    output means for outputting said restored image data to display by respective output primitive attributes.

2. An image data registration and search system for an electronic file device, comprising:
    input means for inputting vector data of a drawing having a plurality of predetermined output primitive attributes;
    conversion means for converting said vector data into image data by respective output primitive attributes;
    coding means for coding said image data to code data by respective output primitive attributes;
    storage means for storing said code data by respective output primitive attributes;
    reading means for reading out said code data stored in said storage means by respective output primitive attributes;
    decoding means for decoding said read out code data to obtain said image data by respective output primitive attributes; and
    output means for outputting said decoded image data to display said image data by respective output primitive attributes or to synthesize and display said image data;

wherein said output primitive attributes are kinds of drawing lines.

3. An image data registration and search system for an electronic file device, comprising:

input means for inputting vector data of a drawing having a plurality of predetermined output primitive attributes;

conversion means for converting said vector data into image data by respective output primitive attributes;

coding means for coding said image data to code data by respective output primitive attributes;

storage means for storing said code data by respective output primitive attributes;

reading means for reading out said code data stored in said storage means by respective output primitive attributes;

decoding means for decoding said read out code data to obtain said image data by respective output primitive attributes; and output means for outputting said decoded image data to display said image data by respective output primitive attributes or to synthesize and display said image data;

wherein said output primitive attributes are line thicknesses.

4. An image data registration and search system for an electronic file device, comprising:

input means for inputting vector data of a drawing having a plurality of predetermined output primitive attributes;

conversion means for converting said vector data into image data by respective output primitive attributes;

coding means for coding said image data to code data by respective output primitive attributes;

storage means for storing said code data by respective output primitive attributes;

reading means for reading out said code data stored in said storage means by respective output primitive attributes;

decoding means for decoding said read out code data to obtain said image data by respective output primitive attributes; and output means for outputting said decoded image data to display said image data by respective output primitive attributes or to synthesize and display said image data;

wherein said output primitive attributes are colors.

5. An image data registration and search system for an electronic file device, comprising:

input means for inputting vector data of a drawing having a plurality of predetermined output primitive attributes;

conversion means for converting said vector data into image data by respective output primitive attributes;

coding means for coding said image data to code data by respective output primitive attributes;

storage means for storing said code data by respective output primitive attributes;

reading means for reading out said code data stored in said storage means by respective output primitive attributes;

decoding means for decoding said read out code data to obtain said image data by respective output primitive attributes; and output means for outputting said decoded image data to display said image data by respective output primitive attributes or to synthesize and display said image data;

wherein said vector data having at least one of said output primitive attributes are converted into said image data.

6. An image data registration and search system for an electronic file device, comprising:

input means for inputting vector data of a drawing having a plurality of predetermined output primitive attributes;

conversion means for converting said vector data into image data by respective output primitive attributes;

coding means for coding said image data to code data by respective output primitive attributes;

storage means for storing said code data by respective output primitive attributes;

reading means for reading out said code data stored in said storage means by respective output primitive attributes;

decoding means for decoding said read out code data to obtain said image data by respective output primitive attributes; and output means for outputting said decoded image data to display said image data by respective output primitive attributes or to synthesize and display said image data;

wherein said image data is coded into said code data by said coding means providing highest compression rate for the associated attribute.

7. An image data registration and search system for an electronic file device, comprising:

input means for inputting vector data of a drawing having a plurality of predetermined output primitive attributes;

conversion means for converting said vector data into image data by respective output primitive attributes;

coding means for coding said image data to code data by respective output primitive attributes;

storage means for storing said code data by respective output primitive attributes;

reading means for reading out said code data stored in said storage means by respective output primitive attributes;

decoding means for decoding said read out code data to obtain said image data by respective output primitive attributes; and output means for outputting said decoded image data to display said image data by respective output primitive attributes or to synthesize and display said image data;

wherein a clipping region is set in a data region of said storage means after said image data is converted into said code data and said image data is stored in said clipping region when said vector data is converted into said image data.

8. An image data registration and search system for an electronic file device, comprising:

input means for inputting vector data of a drawing having a plurality of predetermined output primitive attributes;

conversion means for converting said vector data into image data by respective output primitive attributes;

coding means for coding said image data to code data by respective output primitive attributes;

storage means for storing said code data by respective output primitive attributes;

reading means for reading out said code data stored in said storage means by respective output primitive attributes;

decoding means for decoding said read out code data to obtain said image data by respective output primitive attributes; and output means for outputting said decoded image data to display said image data by respective output primitive attributes or to synthesize and display said image data;

wherein said image data is coded to code data one attribute at a time and said code data and said vector data are combined and stored attribute one attribute at a time.

9. A parallel memory system comprising:

input means for inputting vector data of a drawing having a plurality of output primitive attributes;

converting means for converting said vector data inputted into image data by respective output primitive attributes;

first memory means for storing said image data by respective output primitive attributes;

coding means for coding said image data into code data by respective output primitive attributes;

second memory means for storing said code data by respective output primitive attributes;

reading means for reading out said code data from said second memory means by respective output primitive attributes;

decoding means for decoding said readout code data into image data by respective output primitive attributes;

third memory means for storing said decoded image data by respective output primitive attributes; and control means for displaying an image or a combination of at least two images from said third memory.

10. An image data search system for an electronic file device comprising:

storage means for storing code data having a plurality of output primitive attributes by respective output primitive attributes;

decoding means for decoding said stored code data into said image data by respective output primitive attributes;

first display means for displaying said image data by respective output primitive attributes; and second display means for synthesizing said image data for all of said output primitive attributes and displaying said synthesized image data;

wherein said first display means display said image data for one of said output primitive attributes when a continuous display is performed;

wherein said second display means displays said synthesized image data when said image is displayed stationarily.

11. An image data registration and search method for an electronic file device, comprising the steps of:

inputting vector data of a drawing having a plurality of output primitive attributes each defining one of a plurality of different display properties of said drawing;

converting said vector into image data by respective output primitive attributes;

coding said image data to code data by respective output primitive attributes;

registering said code data with respective output primitive attributes;

searching said registered code data with respective output primitive attributes and deriving said code data by respective output primitive attributes;

decoding said derived code data to restore said image data corresponding thereto by respective output primitive attributes; and outputting said restored image data to display said image data by respective output primitive attributes.

12. An image data registration and search method for an electronic file device, comprising the steps of:

inputting vector data of a drawing having a plurality of predetermined output primitive attributes;

converting said vector data into image data by respective output primitive attributes;

coding said image data to code data by respective output primitive attributes;

storing said code data in storage means by respective output primitive attributes;

reading out said code data stored in said storage means by respective output primitive attributes;

decoding said read out code data to obtain said image data by respective output primitive attributes; and outputting said decoded image data to display said image data by respective output primitive attributes or to synthesize and display said imaged data;

wherein said output primitive attributes are kinds of drawing lines.

13. An image data registration and search method for an electronic file device, comprising the steps of:

inputting vector data of a drawing having a plurality of predetermined output primitive attributes;

converting said vector data into image data by respective output primitive attributes;

coding said image data to code data by respective output primitive attributes;

storing said code data in storage means by respective output primitive attributes;

reading out said code data stored in said storage means by respective output primitive attributes;

decoding said read out code data to obtain said image data by respective output primitive attributes; and outputting said decoded image data to display said image data by respective output primitive attributes or to synthesize and display said imaged data;

wherein said output primitive attributes are line thicknesses.

14. An image data registration and search method for an electronic file device, comprising the steps of:

inputting vector data of a drawing having a plurality of predetermined output primitive attributes;

converting said vector data into image data by respective output primitive attributes;

coding said image data to code data by respective output primitive attributes;

storing said code data in storage means by respective output primitive attributes;

reading out said code data stored in said storage means by respective output primitive attributes;

decoding said read out code data to obtain said image data by respective output primitive attributes; and outputting said decoded image data to display said image data by respective output primitive attributes or to synthesize and display said imaged data;

wherein said output primitive attributes are colors.

15. An image data registration and search method for an electronic file device, comprising the steps of:
inputting vector data of a drawing having a plurality of predetermined output primitive attributes;
converting said vector data into image data by respective output primitive attributes;
coding said image data to code data by respective output primitive attributes;
storing said code data in storage means by respective output primitive attributes;
reading out said code data stored in said storage means by respective output primitive attributes;
decoding said read out code data to obtain said image data by respective output primitive attributes; and
outputting said decoded image data to display said image data by respective output primitive attributes or to synthesize and display said imaged data;
wherein said vector data having at least one of said output primitive attributes are converted into said image data.

16. An image data registration and search method for an electronic file device, comprising the steps of:
inputting vector data of a drawing having a plurality of predetermined output primitive attributes;
converting said vector data into image data by respective output primitive attributes;
coding said image data to code data by respective output primitive attributes;
storing said code data in storage means by respective output primitive attributes;
reading out said code data stored in said storage means by respective output primitive attributes;
decoding said read out code data to obtain said image data by respective output primitive attributes; and
outputting said decoded image data to display said image data by respective output primitive attributes or to synthesize and display said imaged data;
wherein said coding step includes the step of providing highest compression rate for an associated attribute.

17. An image data registration and search method for an electronic file device, comprising the steps of:
inputting vector data of a drawing having a plurality of predetermined output primitive attributes;
converting said vector data into image data by respective output primitive attributes;
coding said image data to code data by respective output primitive attributes;
storing said code data in storage means by respective output primitive attributes;
reading out said code data stored in said storage means by respective output primitive attributes;
decoding said read out code data to obtain said image data by respective output primitive attributes; and
outputting said decoded image data to display said image data by respective output primitive attributes or to synthesize and display said imaged data;
further comprising the step of providing a clipping region in a data region of said storage means after said image data is converted into said code data and wherein said image data is stored in said clipping region when said vector data is converted into said image data.

18. An image data registration and search method for an electronic file device, comprising the steps of:
inputting vector data of a drawing having a plurality of predetermined output primitive attributes;
converting said vector data into image data by respective output primitive attributes;
coding said image data to code data by respective output primitive attributes;
storing said code data in storage means by respective output primitive attributes;
reading out said code data stored in said storage means by respective output primitive attributes;
decoding said read out code data to obtain said image data by respective output primitive attributes; and
outputting said decoded image data to display said image data by respective output primitive attributes or to synthesize and display said imaged data;
wherein said image data is coded to code data one attribute at a time and said code data and said vector data are combined and stored one attribute at a time.

19. A parallel memory method comprising the steps of:
inputting vector data of a drawing having a plurality of output primitive attributes;
converting said vector data inputted into image data by respective output primitive attributes;
storing in a first memory means said image data by respective output primitive attributes;
coding said image data into code data by respective output primitive attributes;
storing in a second memory means said code data by respective output primitive attributes;
reading out said code data from said second memory means by respective output primitive attributes;
decoding said read out code data into image data by respective output primitive attributes;
storing in third memory means said decoded image data by respective attribute;
displaying an image or a combination of at least two images from said decoded image data.

20. The system claimed in claim 1, wherein said output means synthesizes said restored image data and displays said synthesized image data.

21. The method claimed in claim 11, wherein said outputting step includes the steps of synthesizing said restored image data and displaying a synthesized image data.

* * * * *